May 28, 1935.  J. KOPETZ  2,002,896
METHOD OF AND MEANS FOR THE MANUFACTURING OF
HELICALLY GROOVED ENDLESS HOSE AND TUBING
Filed Oct. 30, 1931   2 Sheets-Sheet 2
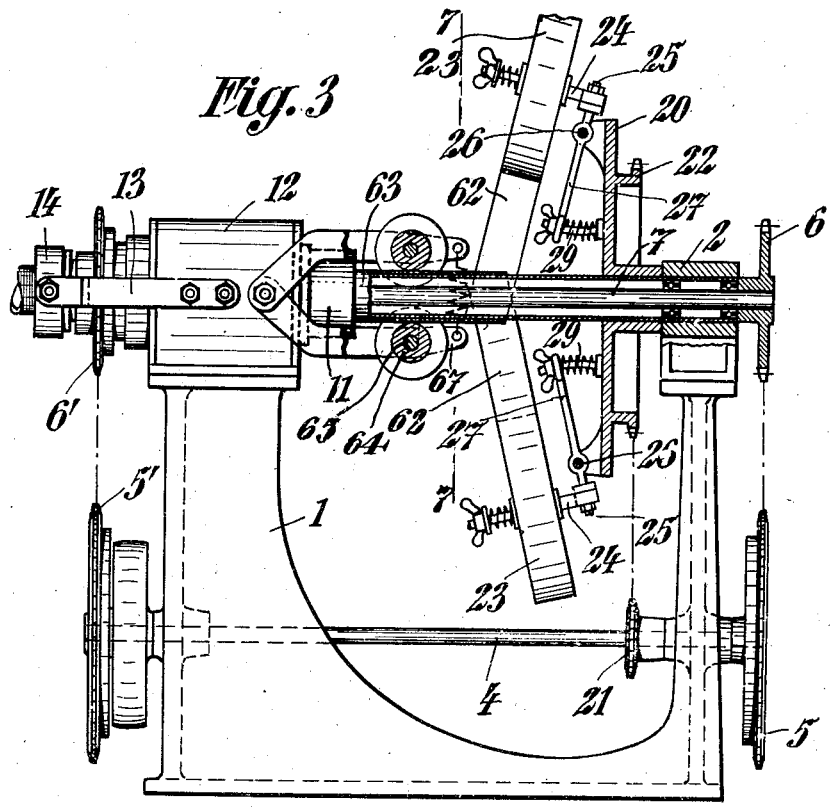
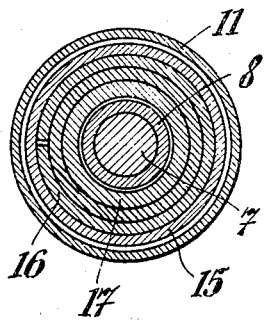
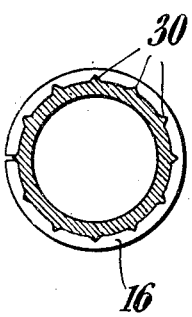
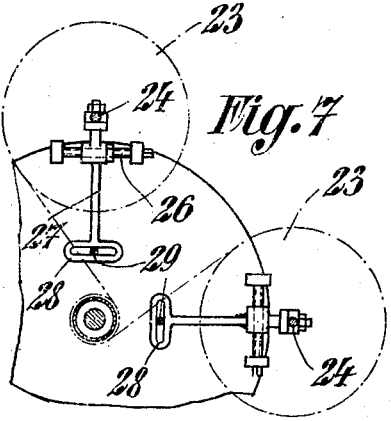

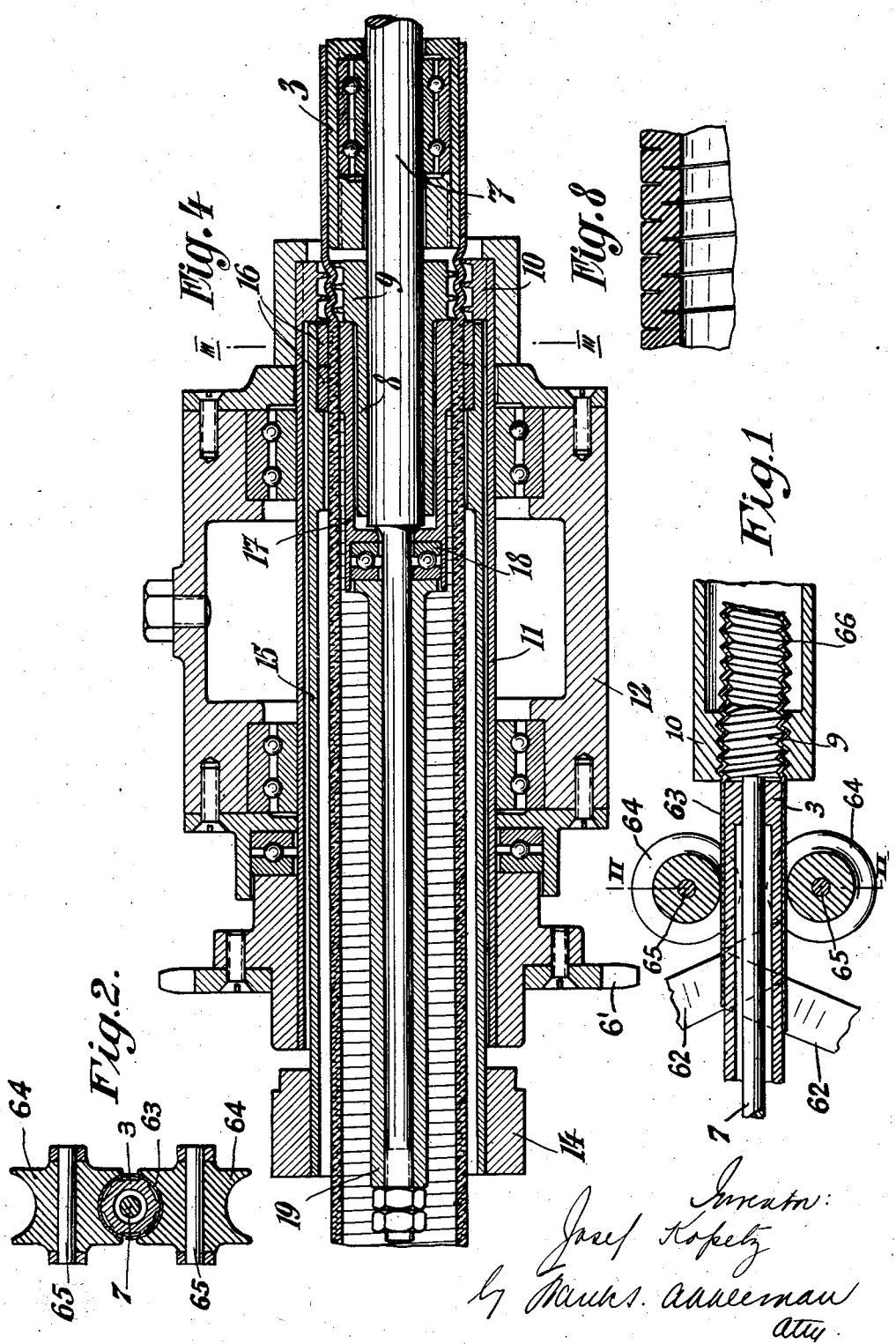

Patented May 28, 1935

2,002,896

UNITED STATES PATENT OFFICE 2,002,896

METHOD OF AND MEANS FOR THE MANUFACTURING OF HELICALLY GROOVED ENDLESS HOSE AND TUBING

Josef Kopetz, Vienna, Austria

Application October 30, 1931, Serial No. 572,164
In Austria November 10, 1930

7 Claims. (Cl. 93—80)

I have filed applications in Austria, November 10, 1930 and October 10, 1931.

This invention relates to a method of and means for the manufacturing of helically grooved endless hose or tubing, and has for its object to effect improvements in and a cheapening both of the method of production hitherto adopted and of the final product.

The method hitherto adopted for producing helically grooved hose or tubing from flexible material is as follows. A helically grooved and rotating mandrel is wound or wrapped with the material used and then screwed through a nut which presses the tubular envelope or casing into the grooves of the mandrel. By this process tubing can only be manufactured piece by piece, since, after the completion of a length, the plant must be brought to a standstill and the tubing unscrewed from the mandrel. But apart from this inconvenience it is impossible to produce long tubing by this method, since it would be necessary to retain the entire length of tubing already finished in constant rotation.

The present invention obviates these drawbacks, and enables flexible tubing to be produced with or without reinforcement, in any desired length, continuously and without reversing the direction of rotation of the mandrel whereon the tubing is formed. Further, the new method enables tubing to be made with a smooth outer and inner surface, and of greater strength than any tubing of a similar nature yet produced.

The new method according to the present invention consist essentially in employing a stationary mandrel and rolls of the material for the tubing adapted to revolve about the mandrel, wrapping the material from these rolls to form a cylindrical tube encasing the mandrel by overlapping the strips derived from a number of such rolls, arranging for the tube to be drawn off the stationary mandrel and helically grooved in one working stage by means of a threaded socket and spindle, and preventing the tube from turning on the mandrel. In accordance with a further development of the invention, the tubing, after leaving the threaded socket is subjected to a further stage in the manufacturing process which consists in compressing or crowding the turns produced by the said threaded socket and spindle, so that the helical grooves appear finally only as fine joints. In this manner the tubing is made more resistant to pressure while retaining its flexibility. The pressing together of the spiral turns of the tubing is effected by forcing the latter through a passage of annular cross-section preferably formed between a slotted spring ring and an inserted sleeve, so that the locking of the tube against rotation is thereby also effected.

Figure 1 illustrates a vertical longitudinal detail section through the head portion of a form of machine for making un-reinforced flexible tubing in accordance with this invention.

Figure 2 illustrates a section on the line II—II of Figure 1.

Fig. 3 illustrates a complete view, partly in side elevation and partly in vertical axial section, of a machine for making un-reinforced flexible tubing with smooth outside and inside surfaces.

Figure 4 illustrates an enlarged detail longitudinal section of the head portion of the machine shown in Figure 3.

Fig. 5 illustrates a section taken on the line III—III of Fig. 4 the outer sleeve being omitted.

Fig. 6 is a section showing a modification of the rings shown in Fig. 4.

Fig. 7 is a detail showing the roll supporting levers used herewith, the view being taken on the line VII—VII of Fig. 3.

Fig. 8 is a longitudinal broken section of the wall of the tubing shown in Fig. 4, on an enlarged scale.

Referring to Figs. 1 and 2, there is rotatably mounted within the hollow stationary mandrel 3 a spindle 7 which is provided at an end projecting from the hollow mandrel with a threaded extension 9, the outside diameter of which is the same as that of the mandrel. This threaded portion is encased by a nut 10, concentrically spaced from the mandrel, which nut is adapted to be driven in the same direction and at the same speed as the spindle 7. The mandrel 3 is wound with overlapping strips or ribbons 62, e. g. of paper, derived from revolving supply rolls, so that a tube 63 is formed on the mandrel 3, which tube is held against rotation by means of clamping rollers 64. The clamping rollers are rotatable about bolts 65 disposed in pairs of arms 67 at right angles to the axis of the mandrel and embrace the tube almost completely. The arms are pressed toward each other by means of springs 68.

The mode of operation of this device is as follows:—

After the formation of a short length of tube from the ribbon-shaped material and the introduction of the same between the threaded socket 10 and plug 9, these latter are caused to rotate. Since the tube 63 is prevented from turning on the mandrel 3 by the clamping rollers 64, it is drawn by the said threaded socket and plug from the mandrel and at the same time helically grooved, so that the tube 66 is produced. The strip material is held together by the grooving, but if desired adhesive can be applied during winding.

The arrangement and drive of the essential parts used in the manufacturing of the continuous tube according to the present invention will now be described with reference to Figs. 3 and 4.

In the framework 1 of the machine there is fixedly mounted in a bearing 2 the mandrel 3 within which the spindle 7 is adapted to be rotatable on ball bearings, and to be driven from a shaft 4 through chain sprocket wheels 5 and 6. This spindle is provided on an end projecting from the mandrel with a collar 8 having a threaded portion 9 encased as before described by a nut 10 (Fig. 4). The threading of these two last-mentioned elements is a widely spaced helix, and the helix of one element is axially displaced with respect to the helix of the other element to the extent of half the pitch, as shown in Fig. 4. The nut member is attached to a tube 11 which runs on balls in the bearing 12 of the framework of the machine, and is provided at its end with a chain sprocket wheel 6' which is driven through a chain and the chain sprocket wheel 5' from the shaft 4. By means of two straps 13 there is attached to the casing of the bearing 12 a collar 14 in which there is a tube 15 firmly inserted which extends up to the nut 10, and is there adapted to hold by means of a shouldered enlargement or recess, two slotted spring rings 16 (Figs. 4 and 5). About the collar 8 there is arranged with slight clearance a sleeve 17 which is supported by a thrust bearing 18 which in its turn bears against a long collar 19 on the spindle 7. The annular space between the spring ring 16 and the sleeve 17 is so dimensioned that it just permits of the passage therethrough of the spirally crimped tube emerging from between the threaded plug 9 and nut 10.

On the mandrel 3 there is rotatably mounted a disc 20 which is driven from the shaft 4 through chain sprocket wheels 21 and 22, and carries uniformly distributed supply rolls 23 for the ribbon-shaped material 62. Each of the rolls 23 is mounted on an arm 24 which is rotatable about a pin 25 on a lever 27 which is capable of rocking about a screw spindle 26. This spindle 26 is mounted in bearings on the disc 20. The axles of articulation 25, 26 thus form a cross joint. The lever 27 is provided at its free end with a slotted guide 28 (Fig. 7) into which a threaded bolt 29 is fitted and screwed into the disc 20. The position of the lever 27, which is kept under the action of a spring, can be ensured by means of a wing nut. The spring slotted rings 16 can be provided on their inner surface with depressions 30 (Fig. 6).

For the manufacturing of tubing a short length of tube 63 is first formed of the ribbon-shaped material on the mandrel 3, and after introduction of the same between the threaded members 9 and 10, the shaft 4 is rotated whereupon the tube is drawn from the mandrel 3 and imparted with the gently spiral shape shown in longitudinal section between the members 9 and 10 in Fig. 4. The tubing thus shaped passes directly into the annular space between the rings 16 and the sleeve 17 in which its forward movement is checked by friction, with the result that the spiral turns produced by the members 9 and 10 are compressed or crowded up together until nothing more remains visible thereof except a fine spiral joint on the inner and outer surfaces (see the enlarged view shown in Fig. 8). The gripping of the tube between the parts 16 and 17 prevents the rotation thereof by the turning threaded members 9, 10. The tubing can be made smooth or with longitudinal grooves. For the latter purpose the ring 16 of the type shown in Fig. 6 is employed. The setting or adjustment of the supply rolls for the strip material can be varied at will, according to need.

The mandrel 3 is especially shaped as to its outer periphery (see cross-section in Fig. 2). As will be seen, in this instance the entire periphery of the mandrel is longitudinally grooved, which has the effect of reducing the friction set up by the withdrawal of the tube and of increasing resistance to turning.

Hose and tubing can be manufactured by the described process in practically unlimited lengths, and of such flexibility and strength that it can be used for a very great variety of purposes, i. e. for pipe lines of all kinds and as insulation covering for electric mains and cables.

I claim:—

1. Apparatus for the purpose set forth including a frame supporting a fixed hollow mandrel, a spindle rotatably mounted within the said mandrel, a threaded plug on the end of said spindle immediately in front of the free end of the said hollow mandrel, an internally threaded member mounted in the said framework and spaced continuously about the said plug, means for rotating the said spindle, plug, and internally threaded member in the same direction and at the same speed, means for revolving rolls of ribbon-shaped material in ribbon form about the said hollow mandrel so that a tube of the said material is formed upon the outside of the said hollow mandrel, and a set of clamping rollers adapted to press against the said tube and to prevent the same from rotating upon the said hollow mandrel.

2. The method of manufacturing tubing which consists in winding flexible ribbon-like material in convolutions having overlapping edges to form a primary ungrooved cylinder, feeding said cylinder forwardly and simultaneously forming a helical corrugation at the forwardly fed end of the cylinder, and compressing the corrugated portion of the tube longitudinally.

3. Apparatus for the purpose set forth including a frame supporting a fixed hollow mandrel, a spindle rotatably mounted within the said mandrel, a threaded plug on the end of said spindle immediately in front of the free end of the said hollow mandrel, an internally threaded member mounted in the said framework and spaced concentrically about the said plug, means for rotating the said spindle, plug, and internally threaded member in the same direction and at the same speed, means for revolving rolls of ribbon-shaped material in ribbon form about the said hollow mandrel so that a tube of the said material is formed upon the outside of the said hollow mandrel, a set of clamping rollers adapted to press against the said tube and to prevent the same from rotating upon the said hollow mandrel, a slotted spring ring at the forward end of the plug and arranged to fit over the formed tube, a sleeve spaced concentrically within the ring, and means to maintain the ring and sleeve stationary and in fixed relation to each other.

4. Apparatus for the purpose set forth including a frame supporting a fixed hollow mandrel, a spindle rotatably mounted within the said mandrel, a threaded plug on the end of said spindle immediately in front of the free end of the said hollow mandrel, an internally threaded member mounted in the said framework and spaced concentrically about the said plug, means for rotating the said spindle, plug, and internally threaded member in the same direction and at the same speed, means for revolving rolls of ribbon-shaped material in ribbon form about the said hollow mandrel so that a tube of the said material is formed upon the outside of the said hollow mandrel, a set of clamping rollers adapted to press against the said tube and to prevent the same from rotating upon the said hollow mandrel, a slotted spring ring at the forward end of the plug and arranged to fit over the formed tube, a sleeve spaced concentrically within the ring, and means to maintain the ring and sleeve stationary and in fixed relation to each other, said slotted ring having its inner face longitudinally grooved whereby alternate ribs and grooves are formed on the tube.

5. Apparatus for the purpose set forth including a frame supporting a fixed hollow mandrel, a spindle rotatably mounted within the said mandrel, a threaded plug on the end of said spindle immediately in front of the free end of the said hollow mandrel, an internally threaded member mounted in the said framework and spaced concentrically about the said plug, means for rotating the said spindle, plug, and internally threaded member in the same direction and at the same speed, supply rolls for winding ribbon-shaped material on said mandrel, carriers for said supply rolls adapted to rotate about the said hollow mandrel, and cross-joints for said carriers adapted to be shifted and locked in a direction intersecting the axis of the spindle.

6. In a tube forming machine, a fixed mandrel, means for winding ribbon-like material in spiral convolutions on the mandrel with the edges of the convolutions overlapping whereby to form a primary cylindrical tube, means to hold the tube against rotation on the mandrel, revolving means at the forward end of the mandrel to simultaneously draw the primary tube off the mandrel and form a helical corrugation therein, and means forward of the last mentioned means to compress the corrugated portion of the tube longitudinally.

7. In a tube forming machine, a fixed mandrel, means for winding ribbon-like material in spiral convolutions on the mandrel with the edges of the convolutions overlapping whereby to form a primary cylindrical tube, means to hold the tube against rotation on the mandrel, revolving means at the forward end of the mandrel to simultaneously draw the primary tube off the mandrel and form a helical corrugation therein, and male and female tube engaging friction members at the forward end of the last mentioned means and spaced to provide an annular slot through which the tube is fed by said last mentioned means.

JOSEF KOPETZ.